Nov. 15, 1932.  E. LATSHAW  1,888,176
RAILWAY TRUCK
Filed March 29, 1932

Inventor:
Elmer Latshaw
by his Attorneys
Howson & Howson

Patented Nov. 15, 1932

1,888,176

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

RAILWAY TRUCK

Application filed March 29, 1932  Serial No. 601,854.

My invention is particularly adapted for use in connection with four-wheel trucks for cars.

One object of my invention is to so connect the journal boxes of the truck with the frame that they will be free to move vertically, and to provide guides on each journal box which will limit the transverse movement of the boxes in respect to the side frames of the truck, and also to provide means to prevent the disarrangement of the journal boxes when it is necessary to raise the frame.

A further object of the invention is to dispense with the usual guiding pedestals for the journal boxes by providing links pivoted to the frame and to the boxes.

Figure 1:
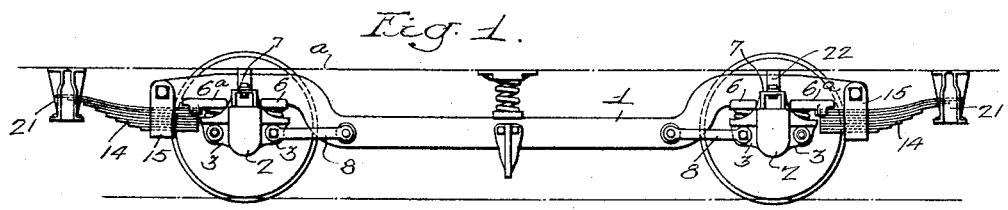
Fig. 1 is a side view of a four-wheeled truck illustrating my invention.

Referring to the drawing, 1 is one of the side frames of a four-wheel car truck. 2—2 are the journal boxes, each box having side extensions 3—3 shaped to form seats 4 for coiled-springs 5. Secured to the underside of the side frames 1 are upper seat plates 6—6a.

On the upper surface of the journal box 2 are two projections 7—7 which are spaced apart to receive the side frame 1. These projections 7 limit the transverse movement of the journal box in relation to the truck frame. Secured to the upper surface of each projection 7 is a U-shaped strap 22 which extends over the side frame 1 of the truck. The strap prevents the disarrangement of the journal box springs and seats, should it be necessary to jack the side frame to raise the car.

Figure 2:
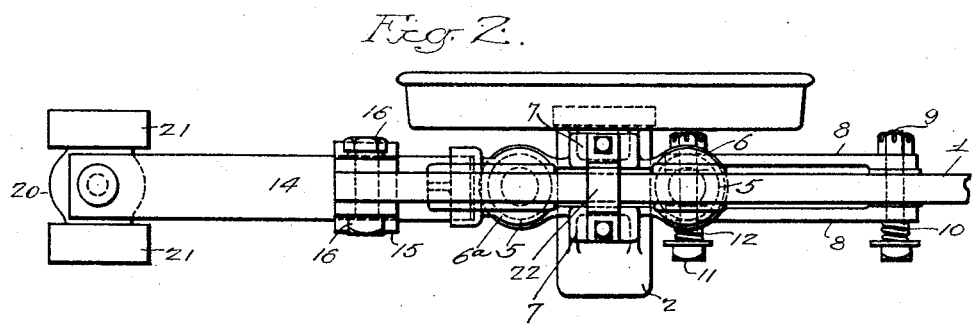
Fig. 2 is an enlarged plan view of one end of the truck and one journal box.

Connecting each journal box 2 with the side frame 1 are two links 8—8, one link being on one side of the side frame and the other link being on the opposite side of the frame. The links are pivotally connected to the frame 1 by pivot bolts 9, and are held against lost motion by springs 10 on the bolts as shown in Fig. 2. The links are also pivotally connected to one of the side extensions 3 of the journal box 2 by pivot bolts 11. The links are held against lost motion by a spring 12 on the bolt 11. By this arrangement the journal box is free to move vertically without tilting, and the projections 7—7 limit the transverse movement of the journal box.

Figure 3:
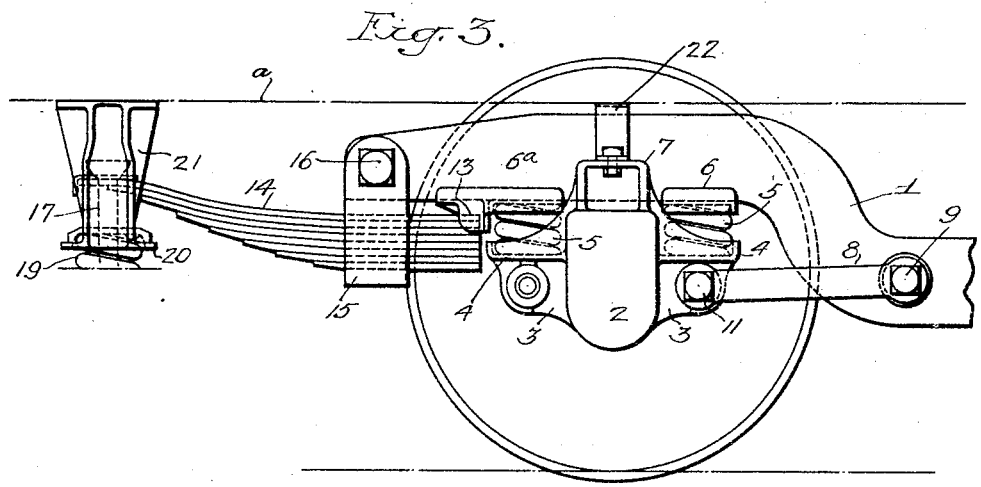
Fig. 3 is an enlarged side view of the parts shown in Fig. 2.

In the present instance the upper seat plate 6a, which is secured to the frame 1, has a pocket 13 for the rear end of a plate spring 14. This spring is suspended from the frame 1 by a stirrup 15, which is pivotally mounted on a bolt 16. The outer end of the plate spring 14 engages a stud 17 having a spring seat for a spring 19, the upper end of the spring being seated against a plate 20 on a frame 21 depending from the car body, shown by dotted lines $a$ in Figs. 1 and 3. This construction of the support for the outer ends of the plate springs may be modified if desired.

I claim:—

1. The combination of the side frame of a car truck; a journal box mounted under the frame and guided against excessive transverse movement independent of the frame; springs between the box and the frame; and a pair of longitudinally extending links spaced apart at opposite ends by the frame and the journal box and pivotally connected to the frame and to the journal box the connections of the links to the frame and journal box including means clampingly engaging the links to the frame and journal box whereby to restrain transverse and longitudinal movement of the journal box with relation to the frame.

2. The combination of a side frame of a car truck; a journal box located under the frame and guided transversely by the frame; lateral projections on the journal box having lower spring seats; upper spring seats on the frame; coiled-springs between the two seats; a link pivotally connected to the frame and to one of the projections of the journal box; one of the upper spring seats having a pocket; a leaf-spring suspended from the frame and having its inner end located in the pocket of the upper spring seat; a car body; and means connecting the outer end of the leaf-spring with the car body.

3. The combination in a four-wheel car truck, of a side frame at each side of the truck, each frame being depressed at the center; a journal box located under the frame near each end thereof; means for preventing excess lateral movement of the boxes in respect to the side frame; links pivotally connected to the depressed portion of the frame and to the inner side of each journal box; lower spring seats on the boxes; upper spring seats on the frame; coiled-springs between the upper and lower seats; a plate spring hung from each end of the frame; an end pocket in the outer spring seat at each end of the frame for the inner end of each plate spring; a car body; and means connecting the outer end of the plate spring to the car body beyond the frame.

ELMER LATSHAW.